US010031781B2

(12) United States Patent
Chen et al.

(10) Patent No.: US 10,031,781 B2
(45) Date of Patent: Jul. 24, 2018

(54) ESTIMATING JOB START TIMES ON WORKLOAD MANAGEMENT SYSTEMS

(71) Applicant: International Business Machines Corporation, Armonk, NY (US)

(72) Inventors: Chong Chen, Richmond Hill (CA); Zhaohui Ding, Beijing (CN); Xiu Qiao Li, Beijing (CN); Rongsong Shen, Beijing (CN); Michael J. Spriggs, Toronto (CA); Wang Qi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/950,621

(22) Filed: Nov. 24, 2015

(65) Prior Publication Data
US 2017/0147404 A1    May 25, 2017

(51) Int. Cl.
G06F 9/46    (2006.01)
G06F 9/50    (2006.01)

(52) U.S. Cl.
CPC ............ G06F 9/5038 (2013.01); G06F 9/505 (2013.01)

(58) Field of Classification Search
None
See application file for complete search history.

(56) References Cited

U.S. PATENT DOCUMENTS

| 2003/0212989 | A1* | 11/2003 | Rokosz | G06F 11/3672 717/135 |
| 2007/0118839 | A1* | 5/2007 | Berstis | G06F 9/5072 718/105 |
| 2009/0007132 | A1* | 1/2009 | Berretta | G06F 9/5027 718/104 |
| 2009/0024381 | A1* | 1/2009 | Sakamoto | G06F 11/3664 703/26 |
| 2010/0122255 | A1 | 5/2010 | Druyan et al. | |
| 2016/0063192 | A1* | 3/2016 | Johnson | G06F 19/327 705/2 |
| 2016/0292811 | A1* | 10/2016 | Brancaccio | G06F 9/5066 |

OTHER PUBLICATIONS

Li et al., Predicting Job Start Times on Clusters, 2004, 8 pages.*
(Continued)

*Primary Examiner* — Diem Cao
(74) *Attorney, Agent, or Firm* — Robert J. Shatto

(57) ABSTRACT

A method for estimating job start times on a system may include: performing a first simulation of the system by a first process to generate a first estimate of the start time based a first snapshot of the computing system; and performing a second simulation of the system to generate a second estimate of the start time. The first and second estimates may each be either a distinct time estimate or a range of time estimate, depending on whether the simulations dispatches the job before the respective first and second processes end. The method may then include generating a fifth estimate of the time that the computing job will start by a third process based on estimates respectively generated by the first and second processes.

15 Claims, 5 Drawing Sheets

(56) References Cited

OTHER PUBLICATIONS

Li et al., "Predicting Job Start Times on Clusters," IEEE International Symposium on Computing and the Grid, 2004, 8 pages, Copyright © 2004, IEEE, DOI: 10.1109/CCGrid.2004.1336581.
"Accelerated Examination Support Document," International Business Machines Corporation, dated Sep. 27, 2016, 15 pages.
Chen et al., "Estimating Job Start Times on Workload Management Systems," U.S. Appl. No. 15/333,227, filed Oct. 25, 2016.
List of IBM Patents or Patent Applications Treated as Related, dated Oct. 11, 2016, 2 pages.

* cited by examiner

PRIORITIZING START TIME ESTIMATES RETURNED BY
ESTIMATOR PROCESS A AND ESTIMATOR PROCESS B:

|  | C1 | C2 |
|---|---|---|
|  | A POINT ESTIMATE | A RANGE ESTIMATE |
| R1 — B POINT ESTIMATE | A | B IF NO CONFLICT<br>A IF CONFLICT |
| R2 — B RANGE ESTIMATE | A | ESTIMATE WITH LATER START TIME |

ESTIMATING JOB START TIMES ON WORKLOAD MANAGEMENT SYSTEMS

BACKGROUND

The present disclosure relates to computer software, and more specifically, to an architecture for estimating computing job start times on cluster computing systems.

Workload management systems are a class of cluster computing systems where multiple users share the resources of a computing cluster. Workload management systems may include a cluster manager that receives jobs submitted by users and decides when and where to allocate resources to execute each job. The received jobs may include a set of resource requirements (e.g., processors, memory, and software licenses) for executing each job. The received jobs may additionally include directives to the cluster manager regarding which cluster nodes may execute the job (e.g., nodes running a particular operating system version). The cluster manager may dispatch jobs to cluster computing nodes according to a plan that limits competition between jobs for resources. When the number of received jobs exceeds the available cluster resources, the cluster manager may schedule jobs that cannot be immediately dispatched for execution at a later time.

SUMMARY

According to embodiments of the present disclosure, a method for estimating a time that a job will start executing on a system having a cluster of computers may include performing a first simulation of the system by a first process to generate either a first or a second estimate of the time that the computing job will start by the first process based on a first snapshot of the system, wherein the first estimate specifies a distinct time and the second estimate specifies a range of times, where the first process generates the first estimate when the first simulation dispatches the computing job before the first simulation ends, and the second estimate when the first simulation fails to dispatch the computing job before the first process ends. The method may additionally include performing a second simulation of the system by a second process to generate either a third or a fourth estimate of the time that the computing job will start by the second process based on a second snapshot of the system, wherein the third estimate specifies a distinct time and the fourth estimate specifies a range of times. The second process may generate the third estimate when the second simulation dispatches the computing job the second process ends, and the fourth estimate when second simulation fails to dispatch the computing job before the second process ends, wherein first and second processes operate in parallel. The method may then include generating a fifth estimate of the time that the computing job will start by a third process based on estimates respectively generated by the first and second processes.

Other embodiments are directed towards systems and computer program products for estimating a time that a job will start executing on a system having a cluster of computers.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 depicts a table for prioritizing computing job start time estimates generated by two estimator processes, according to various embodiments.

Figure 1:
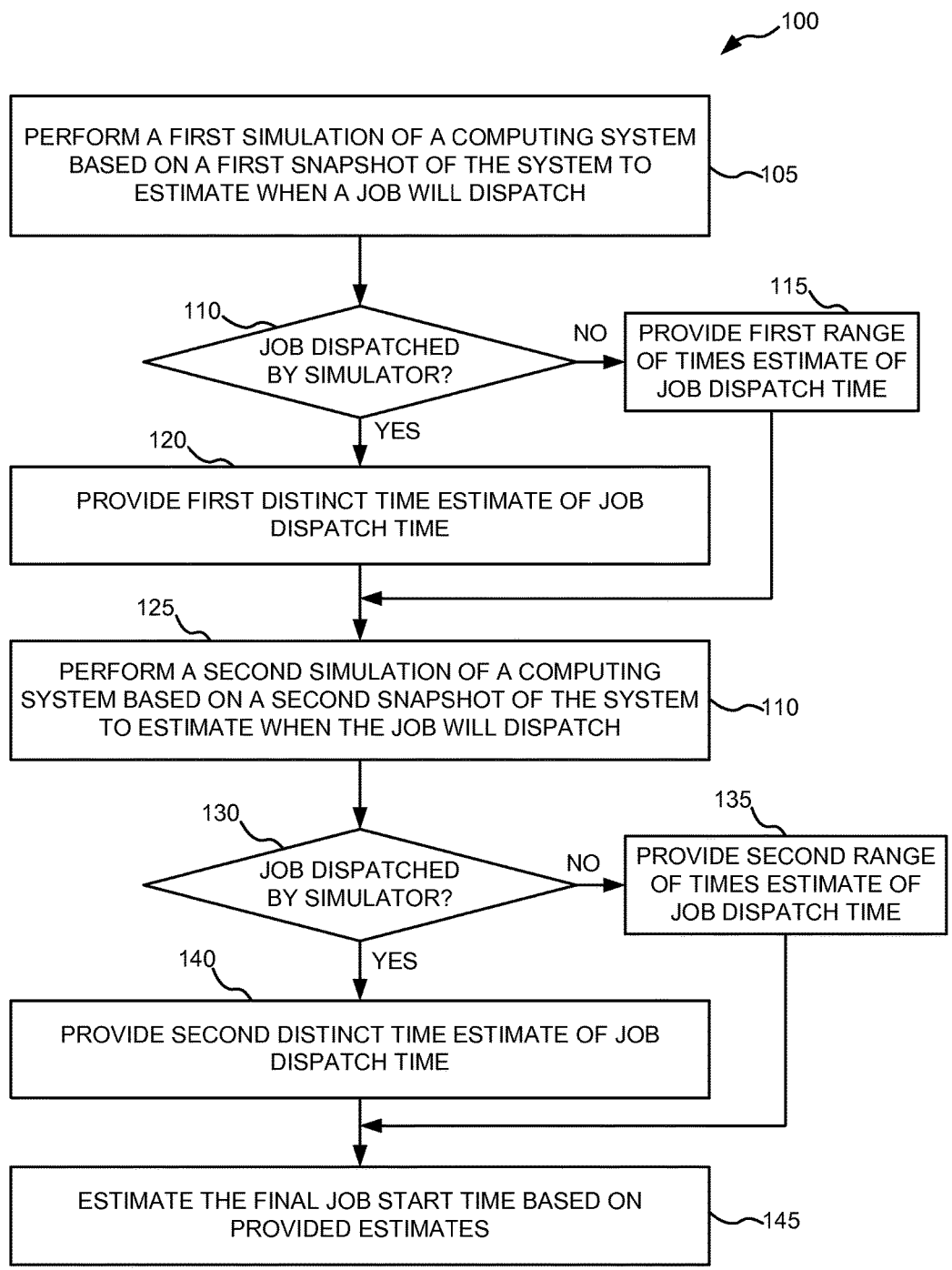
FIG. 1 depicts a flowchart of computer implemented operations for estimating computing job start times on a cluster computing system, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer software; more particular aspects relate to an architecture for estimating computing job start times on cluster computing systems. While the present disclosure is not necessarily limited to such applications, various aspects of the disclosure may be appreciated through a discussion of various examples using this context.

One task of workload management systems includes providing job start time estimates for received jobs that cannot be immediately dispatched to the computing cluster for execution. Estimating a job start time may include determining the runtime of jobs currently executing and/or scheduled to execute on the workload management system. Estimating a job start time may further include predicting the scheduling behavior of the workload management system (e.g., in order to determine when jobs having a given runtime will execute). The scheduling behavior of workload management systems may be influenced by user resource limits, job preemption, resource reservation, and equitable distribution requirements.

Embodiments of the present disclosure are based on the recognition that generating job start time estimates may be facilitated by simulating the execution of jobs on a workload management system. Simulation may address issues of determining job runtimes (e.g., by using historical data) and predicting scheduling behavior of the workload manager (e.g., using statistical data). Simulation of workload management systems, however, can take a considerable amount of time to run. A simulation, for example, that takes an hour to run to completion may not be able to generate start time estimates for jobs that dispatch while the simulator is executing.

Embodiments of the present disclosure are directed towards an architecture, including a method and a system, for generating start time estimates for jobs scheduled to execute on a workload management system. The architecture includes performing a set of simulations of a workload management system. A simulation may be based on a snapshot of the workload management system (e.g., a data centric representation of the workload management system) taking at a given point in time (e.g., immediately before the simulation is executed), and may execute in a computing process of a computing system (e.g., a cluster management system) for a given length of time. Each simulation within the set of simulations may be based on a different snapshot of the system, and may execute within separate computing processes for different lengths of time. Each computing process may provide computing job start time estimates for each job included in the simulations. The job start time estimates for a given job are then prioritized, according to a set of prioritization rules, and merged into a final job start time estimate. In some embodiments, a start time estimate for a given job having the highest priority may then be selected as the final job start time estimate. The simulations may be repeated throughout a job scheduling process to provide updated computing job start time estimates.

As used herein, a computing process (hereinafter, process) may include an instance or thread of a computing software application, script, driver, or other computer executable code executing on a processor of a computing device.

A simulation may be an executable abstraction of a computing system (e.g., a workload management system). The simulation may include algorithmic or mathematical models of components of the computing system implemented in computer executable code. The simulations described herein may include time compression simulations and event based simulations. Time compression simulations include simulations where the simulations' internal clock rate is increased or sped-up to enable component models to execute or emulate functions of a computing system at a faster rate than the actual system components (e.g., the simulation's internal clock runs faster than the system clock). Event based simulations may include simulations where component models emulate system components from an event or state based level of abstraction.

Both time compression and event based simulations may be executed in one or more processes of a computing system to simulate operations of a computing system on a shorter time scale than the system can perform the operations. A process executing a simulation of a workload management system, for example, may have a five minute execution time (e.g., the real runtime of the process). Within the five minute execution time of the process, 30-minutes of simulation time (e.g., the amount of time simulated by the simulation) may have elapsed.

Figure 5:
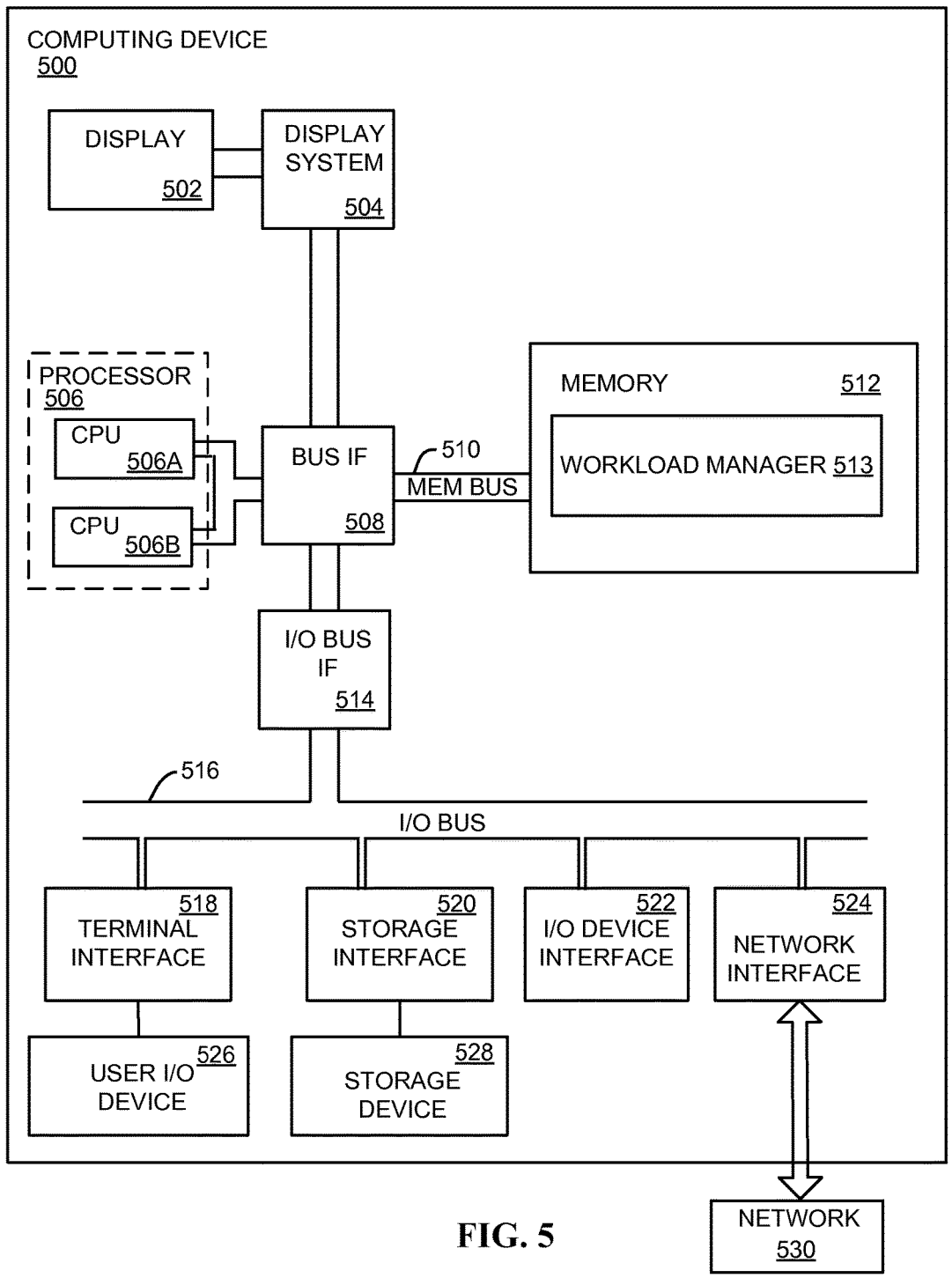
FIG. 5 depicts a block diagram of a computer system for implementing operations for estimating computing job start times on a cluster computing system, according to various embodiments.

Referring now to the figures, FIG. 1 depicts a flowchart 100 of computer implemented operations for estimating job start times on a workload management system, according to various embodiments. Operations of the flowchart 100 may be performed by a software and/or firmware application (hereinafter, workload manager) executing on a processor of a node of the workload management system, such as a cluster manager. In some embodiments, a cluster manager may be a computing system such as the computing system 500 (FIG. 5). The workload manager may execute on a cluster manager, and may include component applications and scripts for scheduling and dispatching computing jobs for execution on the workload management system, as described herein.

The workload manager may begin the operations of the flowchart 100 by executing operation 105, performing a simulation (e.g., a first simulation) of the workload management system. The simulation may be based on a snapshot of the workload management system, including, for example, a catalog of the system's resources, configuration, and pending workload (e.g., jobs that have not executed, or have not finished executing). In some embodiments, the simulation is executed in an estimator process (e.g., a first process) having a determined runtime (e.g., 5 minutes). In certain embodiments, the estimator process runtime may correspond with a longer simulation time (e.g., 30 minutes), as described herein.

The workload manager may continue the operations of the flowchart 100 by executing operation 110, determining whether a computing job was dispatched by a simulation before an estimator process executing the simulation ended. In some embodiments, the estimator process may determine whether a computing job was dispatched during a simulation. The estimator process may additionally provide the workload manager with a list of all computing jobs dispatched during the simulation. For a particular computing job included in a simulation, the flowchart 100 may be continued at operation 115 when the computing job is not dispatched during the simulation, while the flowchart 100 may be continued at operation 120 when the computing job is dispatched during the simulation.

Operation 115 may be executed by providing a range of time estimate (e.g., a first range of times estimate) for the start time of a computing job that was not dispatched by the simulator before the estimator process/simulation ended. In some embodiments, the range of time estimate may indicate that the start time of a computing job is expected to be later than a given time (e.g., the computing job is expected to start later than 5:00 PM). In other embodiments, the range of time estimate may indicate that a job is not expected to start within a certain span of time. For example, when a computing job is not dispatched by a simulator having a 30 minute simulation time, the computing job's range of time estimate may indicate that the computing job is not expected to be dispatched by the workload management system within the next 30 minutes.

Operation 120 may be executed by providing a distinct time estimate (e.g., a first distinct time estimate) for the start time of a computing job that was dispatched by a simulator before the estimator process or simulation ended. In some embodiments, the distinct time estimate may indicate that a computing job is expected to start at a given time of day (e.g., a job is expected to start at 5:00 PM). In other embodiments, a distinct time estimate may indicated that a computing job is expected to start within a distinct span of time. For example, when a computing job is dispatched by a simulator having a 30 minute simulation time, the distinct start time estimate for the computing job may indicate that the computing job is expected to be dispatched by the workload management system within the next 30 minutes.

The workload manager may continue the operations of the flowchart 100 by executing operation 125. Executing operation 125 may include performing a simulation (e.g., a second simulation) of the workload management system, as described in the discussion of operation 105. In some embodiments, the second simulation of the workload management system is based on a second snapshot of the workload management system. The second snapshot may capture substantially the same characteristics of the workload management system as captured by the first snapshot; the second snapshot, however, may be taken at a different time (e.g., a later time) than the first snapshot. In some embodiments, the second simulation may additionally be executed in an estimation process (e.g., a second estimation process) having a different runtime than the first estimation process (e.g., a longer runtime of 10 minutes). The second simulation, consequently, may have a different simulation time than the first simulation.

The workload manager may further continue the operations of the flowchart 100 by executing operation 130, determining whether a computing job was dispatched by the simulator before the estimator process or simulation executed in operation 125 ended. Operation 130 may be executed according to substantially the same steps described for the execution of operation 110. For a given computing job included in the second simulation, the flowchart 100 may be continued at operation 135 when the computing job is not dispatched during the second simulation, while the flowchart 100 may be continued at operation 140 when the computing job is dispatched during the second simulation.

Operation 135 may be executed by providing a range of time estimate (e.g., a second range of times estimate) for the start time of a computing job that was not dispatched by the second simulation before the estimator process/simulation ended, as described in the discussion of operation 115. Operation 140 may be further executed by providing a distinct time estimate (e.g., a second distinct time estimate) for the start time of a computing job that was dispatched by the second simulation before the estimator process or simulator ended, as described in the discussion of operation 120.

Operations 120-140 may be repeated a number of times, thereby executing a number of simulations based on a number of snapshots of the workload management system, and generating or providing a number of computing job start time estimates. Each computing job start time estimate may have varying degrees of reliability or accuracy depending on the estimation process or simulation generating the start time estimate. Estimation processes or simulations based on more recent snapshots, for example, may provide more reliable or accurate start time estimates. These estimates may be more accurate because simulations based on more recent snapshots may provide a truer representation of a system than simulations based on old snapshots. Further, estimation processes or simulations that execute for longer times may generate a greater quantity of distinct time estimates for scheduled computing jobs than estimation processes or simulations that execute for shorter time periods.

The operations of flowchart 100 may be continued by executing operation 145, estimating the final job start time (e.g., a fifth estimate) of a scheduled computing job based on provided start time estimates. The workload manager may maintain, for each scheduled job, a record of each estimate an estimator process generates for the job. Execution of operation 145 may include generating, for each computing job, a listing or vector of all start time estimates for the computing job (e.g., estimates provided by each simulation including the computing job) in a prioritized order. The start time estimates may be prioritized according to a set of prioritization rules. The set of prioritization rules may assign a priority to a start time estimate based on the reliability of the estimate; more reliable estimates may be assigned a higher priority. For a given computing job, the workload manager may select the start time estimate having a highest priority as the final job start time estimate for the computing job.

FIG. 2 depicts a table 200 for prioritizing job start time estimates generated by two estimator processes, according to various embodiments. According to FIG. 2, estimator process A and estimator process B execute simulations based, respectively, on first and second snapshots of a workload management system. The first snapshot (e.g., the snapshot for estimator process A) is taken later in time (e.g., the first snapshot is more recent) than the second snapshot (e.g., the snapshot for estimator process B). Table 200 provides a tabular example of an application of a set of prioritizing rules to job start time estimates for a computing job, generated based on the first and second snapshots.

In some embodiments, a workload manager may determine, based on a first prioritization rule of a set of prioritizing rules, that when an estimator process generates a new start time estimate for a computing job, that new state time estimate replaces all previous start time estimates generated by the same estimator process for the computing job. Two estimator processes may be considered the same if they execute the same simulations (e.g., simulations are based on the same system component models, but, perhaps, based on different snapshots) and have the same run times. As an example, an estimator process having a runtime of 5 minutes and a simulation time of 30 minutes may generate a range of time estimate for a computing job indicating that the computing job is expected to start after 5:00 PM. The same estimator process my run a second simulation (e.g., 20 minutes later) and generate a distinct time estimate indicating that the computing job is expected to start at 5:15 PM. In this situation, the more recent distinct time estimate may replace the earlier range of time estimate.

In some embodiments, a workload manager may determine, based on a second prioritization rule of the set of prioritization rules, that distinct time estimates have higher priority than range of time estimates. One effect of the second prioritizing rule is illustrated in column C1 row R2 of the table 200, where the workload manager may prioritize a distinct time estimate provided by estimator process A over a range of time estimate provided by estimator process B. The effect of the second prioritizing rule is also illustrated in column C2 row R1 of the table 200, where a workload manager may prioritize a point estimate provided by the estimator process B over a range of time estimate provided by the estimator process A. The scenario of column C2 row R1 additionally illustrates an exception to the second prioritizing rule. The exception indicates that a workload manager may prioritize a range of time estimate over a point estimate when there is a conflict between the two estimates, and when the snapshot used in generating the range estimate is more recent than a snapshot used in generating the point estate. A conflict may occur when an estimator process A provides a range of time estimate for the job start time that is later in time than the a distinct time estimate provided by estimator process B. In this conflict situation, the workload manager may prioritize the range of time estimate over the distinct time estimate.

In some embodiments, a workload manager may determine, based on a third prioritization rule of the set of prioritizing rules, that start time estimates generated by estimation processes based on more recent snapshots of a computing system have priority over estimator processes based on less recent snapshots of a system. One effect of the third prioritizing rule is illustrated in column C1 row R1 of the table 200; there, a workload manager may prioritize a point estimate provided by estimator process A over a point estimate provided by the estimator process B because the estimator process A used a more recent snapshot to generate the point estimate than estimator process B.

In some embodiments, a workload manager may prioritize, based on a fourth prioritization rule of the set of prioritization rules, a range estimate providing a later start time over a range estimate providing an earlier start time when selecting between range estimates. This rules is illustrated in column C2, row R2 of the table 200.

Figure 3:
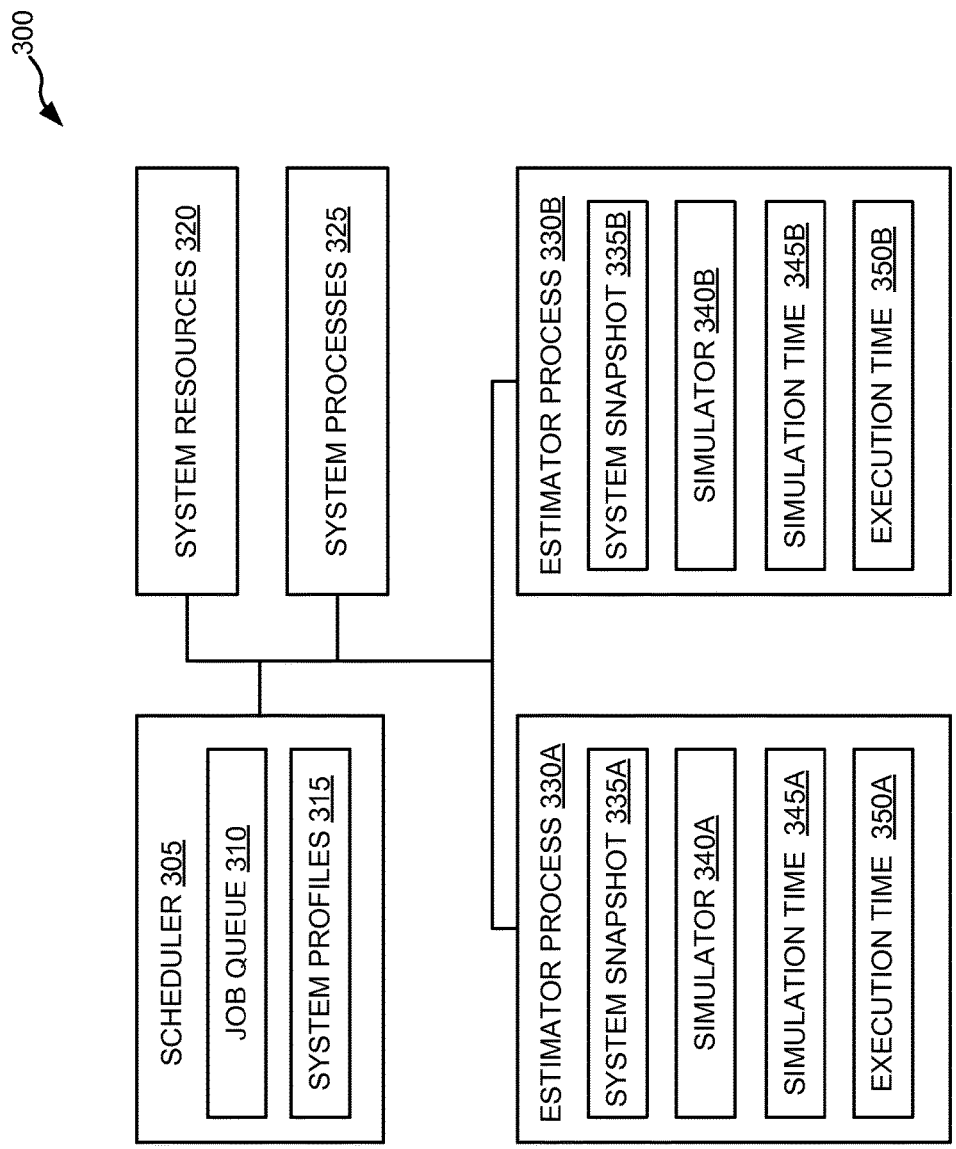
FIG. 3 depicts a block diagram of components of a cluster manager for estimating computing job start times on a cluster computing system, according to various embodiments.

FIG. 3 depicts a block diagram of components of a cluster manager 300 for estimating computing job start times on a cluster computing system, according to various embodiments. The cluster manager 300 may be a managing node of a workload management system, as described herein. The cluster manager 300 may include scheduler 305, system resources component 320, system processes component 325, and estimator components 330A and 330B. The components of the cluster manager application may be software applications, scripts, threads, or processes executing on a process of a computing system, such as a workload management system. The cluster manager 300 may include a workload manager application for orchestrating the interactions of the cluster manager components, described herein. Further, the components of the cluster manager 300, including the workload manager, may exchange data and/or other information, and the exchange may be by methods including access to shared memory locations of the workload management system, inter-process communication mechanisms (e.g., software sockets), or intra-process communication mechanisms (e.g., functions calls, and message passing structures).

The scheduler component 305 may be an application having computer executable code for scheduling and/or dispatching jobs for execution on a workload management system. The scheduler component 305 may include job queue 310 and system profiles 315. The job queue 310 may include computing jobs scheduled to execute on the workload management system. The job queue 310 may also include execution information about each scheduled computing job, which may include information such as job runtime and resource requirements. The system profiles 315 may include a database containing information about individual computing or execution nodes associated with the workload management system. The information may include a node's location, supported operating systems, available software applications, and included system hardware resources. The scheduler component 305 may schedule computing jobs in the job queue 310 to execute on a given computing node based on information in the system profiles 315. In some embodiments, scheduler component 305 may also include historical data about computing jobs that have previously executed on the workload management system. The historical data may include execution times of computing jobs, and a list of system resources used by the computing jobs.

System resources component 320 may include information about currently available resources of nodes associated with the workload management system. The information may be collected by a software application executing on the node and may be stored in a data repository.

System processes component 325 may include a database or table of computing jobs and other processes currently executing on the workload management system. The information may be collected by a software application executing on the node and may be stored in a data repository.

Estimator components 330A and 330B may include, respectively, system snapshots 335A and 335B, simulators 340A and 340B, simulation times 345A and 345B, and execution times 350A and 350B. Simulators 340A and 340B may be based, respectively, on system snapshots 335A and 335B, and have simulation times 345A and 345B. In some embodiments, the simulation times 345A and 345B may correspond, respectively, with execution times 350A and 350B of estimator processes 330A and 330B. In certain embodiments, simulation time 345A may be different from simulation time 345B, as described herein. Additionally, in some embodiments, system snapshot 335A may be captured at a different time than system snapshot 335B.

The estimator processes 330A and 330B may be configured to receive a set of scheduled jobs and associated execution information from scheduler 305. The estimator components 330A and 330B may generate system snapshots 335A and 335B from system resource usage, executing process, and/or system profile information provided by the workload manager 300. The estimator components 330A and 330B may execute, respectively, simulators 340A and 340B to generate job start time estimates for the received list of scheduled jobs. The estimator components 330A and 330B may provide the start time estimates for each job to the scheduler 305. The scheduler 305 may prioritize the list of start time estimates, as described herein.

Figure 4:
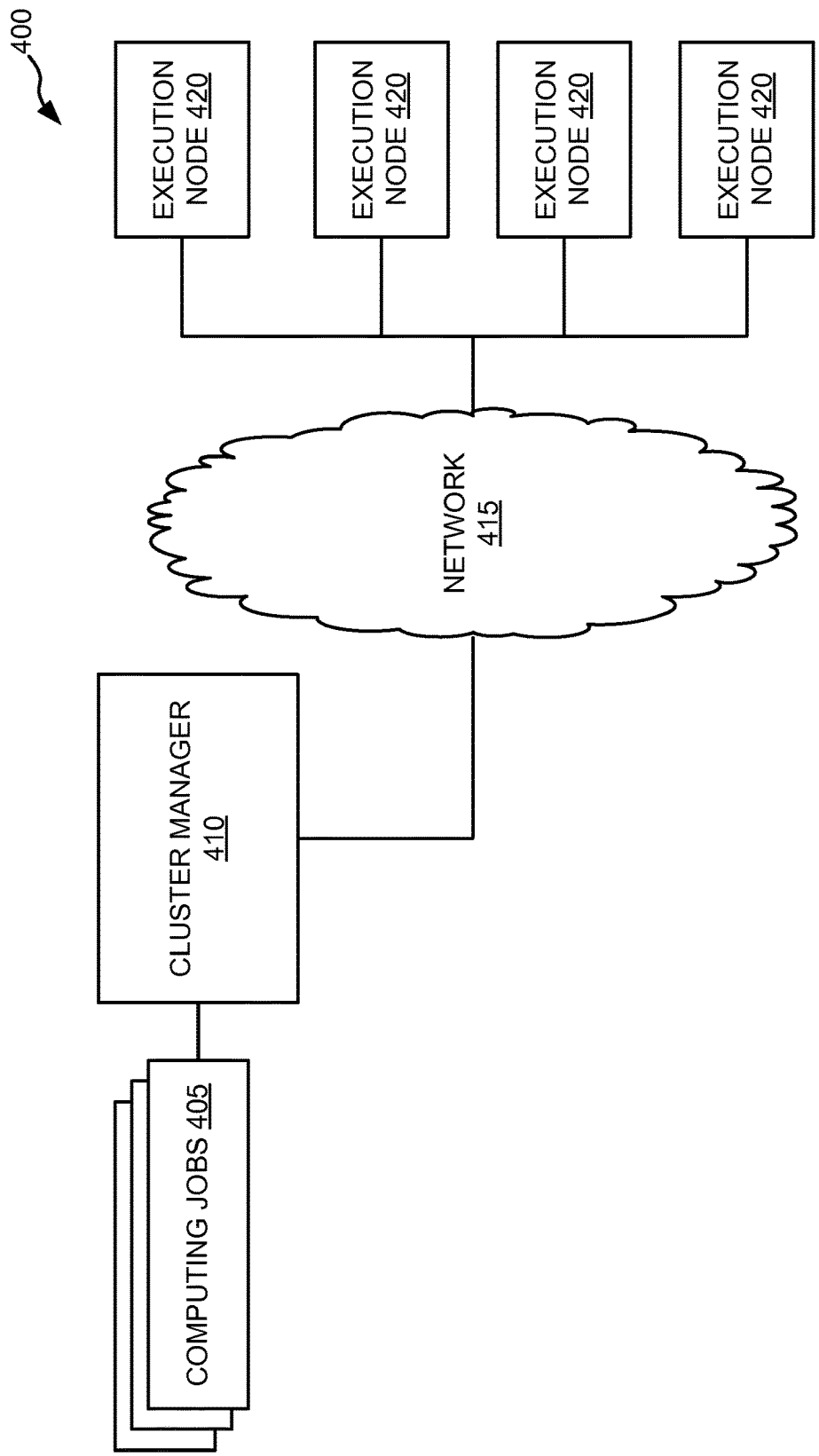
FIG. 4 depicts a diagram of a cluster computing system for estimating computing job start times, according to various embodiments.

FIG. 4 depicts a diagram of a cluster computing environment 400 having a system 410 for estimating job start times on a cluster computing system, according to various embodiments. The cluster computing environment may be a workload management system for executing customer computing jobs, as described herein. The cluster computing environment may include computing jobs 405, cluster manager 410, data communications network 415, and execution nodes 420. Computing jobs 405 may include computer executable tasks provided by customers for execution on a workload management system. The cluster manager 410 may be a workload manager having software applications executing one or more computing/execution nodes. The workload manager may include substantially the same components as the workload manager 300 (FIG. 3). The cluster manager 410 may be coupled to execution nodes 420 through the data communications network 415. In some embodiments, the cluster manager 410 may receive computing jobs 405 from an input terminal, a storage medium (e.g., a hard disk drive, solid state drive, or optical disc drive), and/or data communications network. The cluster manager 410 may schedule and dispatch the received computing jobs for execution on execution nodes 420 via data communication network 415. The cluster manager my provide job start time estimates to customers and/or system administrators, as described herein.

FIG. 5 depicts a block diagram of a computer system for implementing operations to estimate computing job start times on a cluster computing system, according to various embodiments.

The components of the computing device 500 may include one or more processors 506, a memory 512, a terminal interface 518, a storage interface 520, an Input/Output ("I/O") device interface 522, and a network interface 524, all of which are communicatively coupled, directly or indirectly, for inter-component communication via a memory bus 510, an I/O bus 516, bus interface unit ("IF") 508, and an I/O bus interface unit 514.

The computing device 500 may include one or more general-purpose programmable central processing units (CPUs) 506A and 506B, herein generically referred to as the processor 506. In certain embodiments, a processor may be any electronic device for executing a sequence of programmed instructions. In an embodiment, the computing device 500 may contain multiple processors; however, in another embodiment, the computing device 500 may alternatively be a single CPU device. Each processor 506 executes instructions stored in the memory 512.

The computing device 500 may include a bus interface unit 508 to handle communications among the processor 506, the memory 512, the display system 504, and the I/O bus interface unit 514. The I/O bus interface unit 514 may be coupled with the I/O bus 516 for transferring data to and from the various I/O units. The I/O bus interface unit 514 may communicate with multiple I/O interface units 518, 520, 522, and 524, which are also known as I/O processors (IOPs) or I/O adapters (IOAs), through the I/O bus 516. The display system 504 may include a display controller, a display memory, or both. The display controller may provide video, audio, or both types of data to a display device 502. The display memory may be a dedicated memory for buffering video data. The display system 504 may be coupled with a display device 502, such as a standalone display screen, computer monitor, television, a tablet or handheld device display, or another other displayable device. In an embodiment, the display device 502 may include one or more speakers for rendering audio. Alternatively, one or more speakers for rendering audio may be coupled with an I/O interface unit. In alternate embodiments, one or more functions provided by the display system 504 may be on board an integrated circuit that also includes the processor 506. In addition, one or more of the functions provided by the bus interface unit 508 may be on board an integrated circuit that also includes the processor 506.

The I/O interface units support communication with a variety of storage and I/O devices. For example, the terminal interface unit 518 may support the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 526 and the computing device 500, or may receive output data via the user output devices. For example, a user interface may be presented via the user I/O device 526, such as may be displayed on a display device, played via a speaker, or printed via a printer.

The storage interface 520 supports the attachment of one or more storage devices, which may include disk drives or direct access storage devices 528 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 528 may be implemented via any type of secondary storage device. The contents of the memory 512, or any portion thereof, may be stored to and retrieved from the storage device 528 as needed. The I/O device interface 522 provides an interface to any of various other I/O devices or devices of other types, such as printers or fax machines. The network interface 524 provides one or more communication paths from the computing device 500 to other digital devices and computer systems.

Although the computing device 500 shown in FIG. 5 illustrates a particular bus structure providing a direct communication path among the processors 506, the memory 512, the bus interface 508, the display system 504, and the I/O bus interface unit 514, in alternative embodiments the computing device 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 514 and the I/O bus 508 are shown as single respective units, the computing device 500, may include multiple I/O bus interface units 514 and/or multiple I/O buses 516. While multiple I/O interface units are shown, which separate the I/O bus 516 from various communication paths running to the various I/O devices, in other embodiments, some or all of the I/O devices are connected directly to one or more system I/O buses.

In various embodiments, the computing device 500 is a multi-user mainframe computer system, a single-user system, or a server computer or similar device that has little or no direct user interface, but receives requests from other computer systems (clients). In other embodiments, the computing device 500 may be implemented as a desktop computer, portable computer, laptop or notebook computer, tablet computer, pocket computer, telephone, smart phone, or any other suitable type of electronic device.

In an embodiment, the memory 512 may include a random-access semiconductor memory, storage device, or storage medium (either volatile or non-volatile) for storing or encoding data and programs. In another embodiment, the memory 512 represents the entire virtual memory of the computing device 500, and may also include the virtual memory of other computer systems coupled to the computing device 500 or connected via a network 530. The memory 512 may be a single monolithic entity, but in other embodiments the memory 512 may include a hierarchy of caches and other memory devices. For example, memory may exist in multiple levels of caches, and these caches may be further divided by function, so that one cache holds instructions while another holds non-instruction data, which is used by the processor. Memory 512 may be further distributed and associated with different CPUs or sets of CPUs, as is known in any various so-called non-uniform memory access (NUMA) computer architectures.

The memory 512 may store all or a portion of the components and data shown in FIGS. 1-4. In particular, the memory 512 may store the workload management application 513, along with the modules, scripts and library components used to implement the operations of the present disclosure. The workload management application 513 may include computer executable code for performing operations described in flowchart 100 of FIG. 1. The workload management application 513 may additionally include computer executable code for orchestrating and performing operations of the components described in the discussion of FIGS. 2 and 4. The computer executable code may be executed by processor 506. Some or all of the components and data shown in FIGS. 1-4 may be on different computer systems and may be accessed remotely, e.g., via a network 530. The computing device 500 may use virtual addressing mechanisms that allow the programs of the computing device 500 to behave as if they only have access to a large, single storage entity instead of access to multiple, smaller storage entities. Thus, while the components and data shown in FIGS. 1-4 are illustrated as being included within the memory 512, these components and data are not necessarily all completely contained in the same storage device at the same time. Although the components and data shown in FIGS. 1-4 are illustrated as being separate entities, in other embodiments some of them, portions of some of them, or all of them may be packaged together.

In an embodiment, the components and data shown in FIGS. 1-4 may include instructions or statements that execute on the processor 506 or instructions or statements that are interpreted by instructions or statements that execute the processor 506 to carry out the functions as further described below. In another embodiment, the components shown in FIGS. 1-4 may be implemented in hardware via semiconductor devices, chips, logical gates, circuits, circuit cards, and/or other physical hardware devices in lieu of, or in addition to, a processor-based system. In an embodiment, the components shown in FIGS. 1-4 may include data in addition to instructions or statements.

FIG. 5 is intended to depict representative components of the computing device 500. Individual components, however, may have greater complexity than represented in FIG. 5. In FIG. 5, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    performing a first simulation of a cluster computing system having a cluster of computers by a first process to generate either a first or a second estimate of the time that a computing job among a plurality of computing jobs will start based on a first snapshot of the cluster computing system, wherein the first estimate specifies a distinct time and the second estimate specifies a range of times, the first process generating
        the first estimate when the first simulation dispatches the computing job before the first simulation ends, and
        the second estimate when the first simulation fails to dispatch the computing job before the first process ends;
    performing a second simulation of the cluster computer system by a second process to generate either a third or a fourth estimate of the time that the computing job will start based on a second snapshot of the cluster computer system, wherein the third estimate specifies a distinct time and the fourth estimate specifies a range of times, the second process generating
        the third estimate when the second simulation dispatches the computing job before the second process ends, and
        the fourth estimate when the second simulation fails to dispatch the computing job before the second process ends, wherein the first and second processes operate in parallel;
    generating a final estimate of the time that the computing job will start by a third process based on estimates respectively generated by the first and second processes, wherein the estimates are prioritized according to a set of prioritization rules;
    wherein estimating a job start time includes determining the runtime of jobs currently executing and/or scheduled to execute on a workload management system;
    wherein estimating the job start time includes predicting scheduling behavior of the workload management system in order to determine when jobs having a given runtime will execute, wherein job start time estimates are provided to customers and/or system administrators;
    wherein performing a simulation includes performing at least one of an event based simulation of the cluster computing system and a time compression based simulation of the cluster computing system,
        wherein the event based simulation comprises a simulation wherein component models emulate components of the cluster computing system from an event or state based level of abstraction and
        wherein the time compression based simulation comprises a simulation wherein an internal clock rate of the simulation is increased or sped-up to enable component models to execute or emulate functions of the cluster computing system at a faster rate than the components of the cluster computing system; and
    scheduling the plurality of computing jobs in a job queue,
        wherein the job queue includes the plurality of computing jobs scheduled to execute on the workload management system, wherein the job queue includes job runtime and resource requirements of the plurality of computing jobs.

2. The method of claim 1, wherein respective first and second simulation times of the first and second simulations are substantially equal.

3. The method of claim 1, wherein generating a final estimate of the time that the computing job will start further comprises:
    prioritizing the estimates generated by the first and second processes; and
    selecting an estimate having a greatest priority as the job start time.

4. The method of claim 3, wherein the prioritizing comprises:
    assigning an estimate a priority based on whether the estimate specifies a distinct time or a range of times.

5. The method of claim 3, wherein the prioritizing comprises:
    assigning an estimate a priority based on a time when a snapshot used by a simulation to generate the estimate was taken.

6. A system, comprising:
    one or more computing nodes having a memory and a processor; and
    a computer readable storage medium of the one or more computing nodes having program instructions embodied therewith, the program instructions executable by the processor to cause the system to
        perform a first simulation of a cluster computing system having a cluster of computers by a first process to generate either a first or a second estimate of a time that a computing job among a plurality of computing jobs will start based on a first snapshot of the system, wherein the first estimate specifies a distinct time and the second estimate specifies a range of times, the first process generating
            the first estimate when the first simulation dispatches the computing job before the first simulation ends, and
            the second estimate when the first simulation fails to dispatch the computing job before the first process ends, perform a second simulation of the cluster computer system by a second process to generate either a third or a fourth estimate of the time that the computing job will start based on a second snapshot of the cluster computer system, wherein the third estimate specifies a distinct time and the fourth estimate specifies a range of times, the second process generating the third estimate when the second simulation dispatches the computing job before the second process ends, and the fourth estimate when the second simulation fails to dispatch the computing job before the second process ends, wherein the first and second processes operate in parallel, and generate a final estimate of the time that the computing job will start by a third process based on estimates respectively generated by the first and second processes, wherein the estimates are prioritized according to a set of prioritization rules, wherein estimating a job start time includes determining the runtime of jobs currently executing and/or scheduled to execute on a workload management system, wherein estimating the job start time includes predicting scheduling behavior of the workload management system in order to determine when jobs having a given runtime will execute, wherein job start time estimates are provided to customers and/or system administrators, wherein performing a simulation includes performing at least one of an event based simulation of the cluster computing system and a time compression based simulation of the cluster computing system, wherein the event based simulation comprises a simulation wherein component models emulate components of the cluster computing system from an event or state based level of abstraction and wherein the time compression based simulation comprises a simulation wherein an internal clock rate of the simulation is increased or sped-up to enable component models to execute or emulate functions of the cluster computing system at a faster rate than the components of the cluster computing system, and schedule the plurality of computing jobs in a job queue, wherein the job queue includes the plurality of computing jobs scheduled to execute on the workload management system, wherein the job queue includes job runtime and resource requirements of the plurality of computing jobs.

7. The system of claim 6, wherein respective first and second simulation times of the first and second simulations are substantially equal.

8. The system of claim 6, wherein the program instructions executable by the processor further cause the system to:

prioritize the estimates generated by the first and second processes; and select an estimate having a greatest priority as the job start time.

9. The system of claim 8, wherein the program instructions executable by the processor further cause the system to:

assign an estimate a priority based on whether the estimate specifies a distinct time or a range of times.

10. The system of claim 8, wherein the program instructions executable by the processor further cause the system to:

assign an estimate a priority based on a time when a snapshot used by a simulation to generate the estimate was taken.

11. A computer program product, the computer program product including a computer readable storage medium having program instructions embodied therewith, the program instructions executable by a processing circuit to cause the processing circuit to perform a method comprising:

performing a first simulation of a cluster computing system having a cluster of computers by a first process to generate either a first or a second estimate of the time that a computing job among a plurality of computing jobs will start based on a first snapshot of the cluster computing system, wherein the first estimate specifies a distinct time and the second estimate specifies a range of times, the first process generating the first estimate when the first simulation dispatches the computing job before the first simulation ends, and the second estimate when the first simulation fails to dispatch the computing job before the first process ends;

performing a second simulation of the cluster computing system by a second process to generate either a third or a fourth estimate of the time that the computing job will start based on a second snapshot of the cluster computing system, wherein the third estimate specifies a distinct time and the fourth estimate specifies a range of times, the second process generating the third estimate when the second simulation dispatches the computing job before the second process ends, and the fourth estimate when the second simulation fails to dispatch the computing job before the second process ends, wherein the first and second processes operate in parallel;

generating a final estimate of the time that the computing job will start by a third process based on estimates respectively generated by the first and second processes, wherein the estimates are prioritized according to a set of prioritization rules;

wherein estimating a job start time includes determining the runtime of jobs currently executing and/or scheduled to execute on a workload management system;

wherein estimating the job start time includes predicting scheduling behavior of the workload management system in order to determine when jobs having a given runtime will execute, wherein job start time estimates are provided to customers and/or system administrators;

wherein performing a simulation includes performing at least one of an event based simulation of the cluster computing system and a time compression based simulation of the cluster computing system, wherein the event based simulation comprises a simulation wherein component models emulate components of the cluster computing system from an event or state based level of abstraction and wherein the time compression based simulation comprises a simulation wherein an internal clock rate of the simulation is increased or sped-up to enable component models to execute or emulate functions of the cluster computing system at a faster rate than the components of the cluster computing system; and scheduling the plurality of computing jobs in a job queue, wherein the job queue includes the plurality of computing jobs scheduled to execute on the workload management system, wherein the job queue includes job runtime and resource requirements of the plurality of computing jobs.

12. The computer program product of claim 11, wherein respective first and second simulation times of the first and second simulations are substantially equal.

13. The computer program product of claim 11, wherein generating a final estimate of the time that the computing job will start further comprises:
   prioritizing the estimates generated by the first and second processes; and
   selecting an estimate having a greatest priority as the job start time.

14. The computer program product of claim 13, wherein the prioritizing comprises:
   assigning an estimate a priority based on whether the estimate specifies a distinct time or a range of times.

15. The computer program product of claim 13, wherein the prioritizing comprises:
   assigning an estimate a priority based on a time when a snapshot used by a simulation to generate the estimate was taken.

* * * * *